Nov. 19, 1968     R. B. MILLER     3,411,304
DOCK FENDER
Filed May 15, 1967
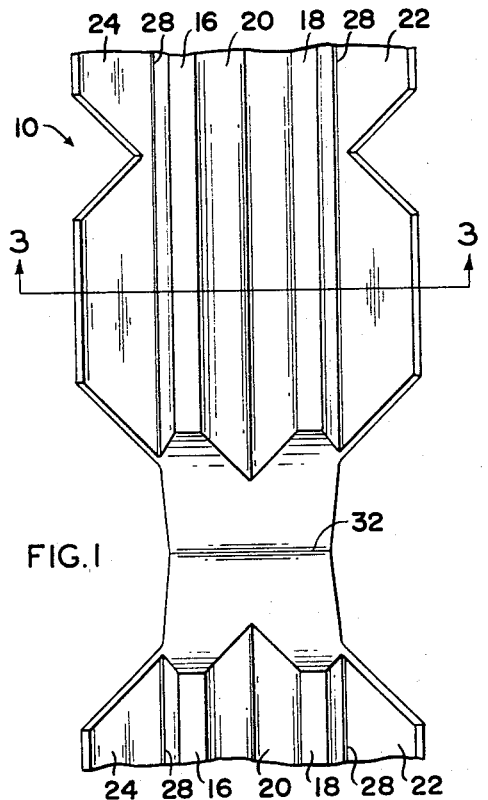
FIG.1
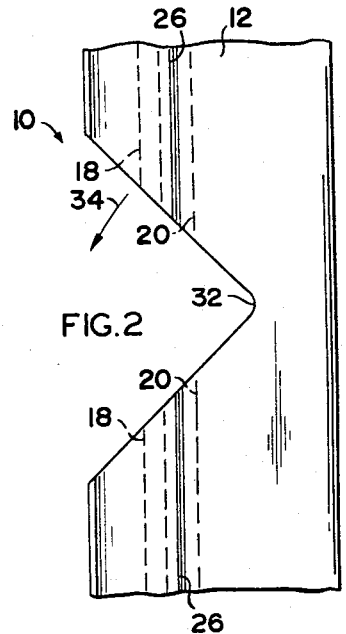
FIG.2
FIG.3
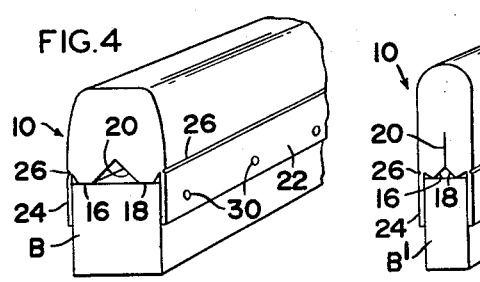
FIG.4    FIG.5
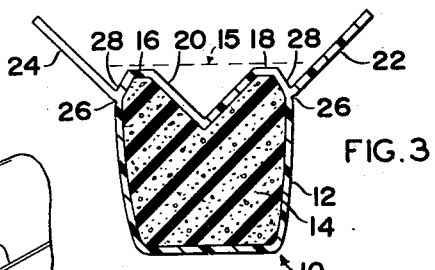
FIG.6
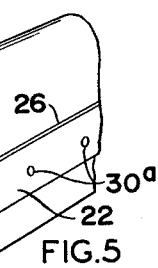
FIG.8
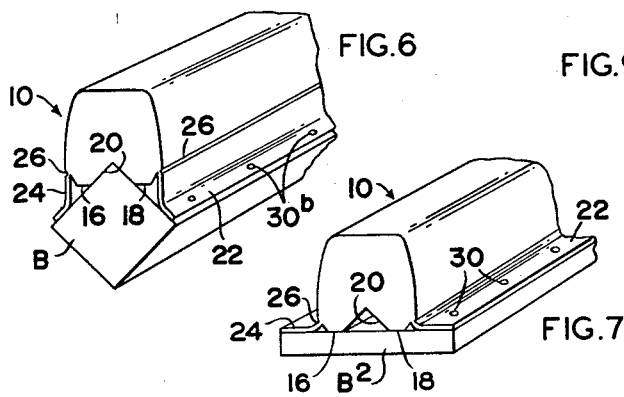
FIG.7
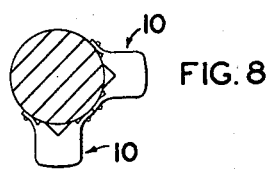
FIG.9    FIG.10
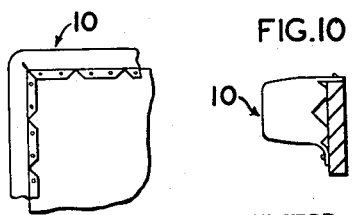
INVENTOR.
RUSSELL B. MILLER
BY
*Oldham & Oldham*
ATTORNEYS.

United States Patent Office 3,411,304
Patented Nov. 19, 1968

3,411,304
DOCK FENDER
Russell B. Miller, Akron, Ohio, assignor to Barberton Plastics Products, Inc., Barberton, Ohio, a corporation of Delaware
Filed May 15, 1967, Ser. No. 638,534
5 Claims. (Cl. 61—48)

ABSTRACT OF THE DISCLOSURE

A resilient body for use as a dock fender or the like having a face portion adapted to conform to the surface of the object to which the fender is to be secured. Integral flap portions extending outwardly from the body along the lateral margins of the face portion are provided to facilitate securing the fender to the object.

---

This invention relates to an elongate foam-filled plastic body adapted to be secured to a dock, or boat, or the like in order to serve as a fender. Basically, the fender is comprised of an elongate resilient body having a face portion adapted to abut against and conform substantially to the surface of the object to which the fender is to be secured. Integral flap portions extending outwardly from the body along the lateral margins of the face portion are foldable along the margins toward or away from the face to facilitate securing the fender to an object. It should be understood, however, that even though the invention is illustrated and described as a dock fender, it is obvious that the use thereof is not limited as such, but is as defined and claimed below.

For a more detailed disclosure of the dock fender of the invention, reference should be had to the accompany drawings wherein:

FIG. 1 is a fragmentary plan view of a preferred embodiment of the dock fender of the invention;

FIG. 2 is a side elevation of the embodiment of FIG. 1 particularly illustrating the structural feature of the fender which allows it to be folded to a 90° angle;

FIG. 3 is a cross-sectional view of the dock fender of the invention taken substantially along line 3—3 of FIG. 1;

FIG. 4 is a fragmentary perspective view particularly illustrating the dock fender secured to a large square board, such as a 4″ x 4″;

FIG. 5 is a fragmentary perspective view similar to FIG. 4 particularly illustrating the dock fender secured to a smaller board such as a 2″ x 4″;

FIG. 6 is a fragmentary perspective view similar to FIGS. 4 and 5 particularly illustrating the dock fender secured to the corner of a 4″ x 4″ board;

FIG. 7 is a fragmentary perspective view similar to FIGS. 4, 5, and 6, particularly illustrating the dock fender secured to a substantially flat board; and FIGS. 8, 9, and 10 illustrate the versatility of the fender of the invention to irregular and sundry surfaces showing how it can be secured to almost any structure.

Now referring to the drawings in greater detail, and referring first to FIG. 3, the numeral 10 generally illustrates the fender of the invention. The fender is basically comprised of an elongated hollow body or shell 12, preferably made from a suitable flexible plastic, such as vinyl resin or some similar material, and is filled with a suitable flexible foam 14 such as polyurethane foam in order to make the fender 10 resilient so that it will cushion a boat or the like striking it. In some instances depending on the flexibility of the materials used, it may be desirable to inflate the shell 12 rather than using a flexible foam 14 to provide the desired resilience.

It is an important feature of the present invention to provide a substantially flat face portion, indicated generally by dotted line 15, on the fender 10 which is adapted to abut against and conform substantially to the surface of the object to which the fender is to be secured. The face portion 15 of the fender is formed with two substantially flat parallel panel surfaces 16 and 18 which are separated from each other by a V-shaped groove or channel 20. It is the flat panel surfaces 16 and 18 which will under most circumstances abut against the surface of the object to which the fender 10 is to be secured.

As another important feature of the invention a pair of integral flaps 22 and 24 are provided. As is best illustrated by FIGS. 1 and 3, the flaps 22 and 24 extend outwardly of the body of the fender 10 along the outside edges or lateral margins of the panel surfaces 16 and 18. The purpose of the flaps is to provide portions of the fender 10 which are easily foldable toward or away from the face portion 15 of the fender in order to lay over the surface of the object to which the fender is to be secured. Since the flaps are easily foldable to lay over or to lay flat against the surface of the object to which the fender is to be secured, use of the flaps greatly facilitates securing the fender 10 to the object to which it is to be secured, even if such object has an irregular surface. In order to allow the flaps 22 and 24 to be easily folded for the reasons mentioned above, grooves or indents 26 and 28 are provided in opposed relation on opposite faces of each flap substantially where each flap joins the body or lateral margin of the fender 10.

The structure of the fender 10 as described above allows the fender 10 to be readily secured to various sized and shaped objects in the manner illustrated by FIGS. 4–10. For example, FIG. 4 illustrates the fender 10 secured to a 4″ x 4″ dock beam B. As illustrated by FIG. 4, the dock fender 10 readily secures to such a size beam by merely placing panel surfaces 16 and 18 flatly against one surface or face of the beam B and then folding the flaps 22 and 24 downwardly over the adjacent sides for securing thereto as by nails 30. Since the beam B is quite wide, the groove 20 remains open as the fender 10 is secured thereto.

FIG. 5 illustrates the same fender 10 secured to a 2″ x 4″ dock beam $B_1$. In this case, since the beam $B_1$ is not as wide at the face to which the fender 10 is secured, the two panel surfaces 16 and 18 are pushed or compressed together in order to squeeze the sides of the groove 20 together, thereby having the effect of closing the groove 20. Again flaps 22 and 24 readily fold over the sides of beam $B_1$ and secure thereto as by nails 30a. Thus, in this example, the two panel surfaces 16 and 18 can be squeezed together to reduce the width of the fender where it can be readily secured to beam $B_1$ which is of less thickness than beam B.

FIG. 6 illustrates the fender 10 secured to the corner of the 4″ x 4″ beam B. The sides of the groove 20 intersect with each other at about a 90° angle so that the corner of the beam B snugly fits into groove 20. Again, in this situation, flaps 22 and 24 fold down into substantially flat engagement with the sides of the beam B so that nails 30b can be utilized to secure the fender 10 to the beam B.

FIG. 7 illustrates a manner in which the fender 10 is secured to a substantially flat dock beam, for example, 2″ x 8″ beam $B_2$. In this example, opposed indents 26 and 28 readily allow the flaps 22 and 24 to be folded upwardly away from the face portion of the fender in order to lay flat on the surface of the beam $B_2$ whereby the fender can be secured thereto by use of nails 30.

FIGS. 8 through 10 show the fender secured to a round piling, around a corner, and to the top edge of a dock board, respectively. This clearly illustrates the adaptability to various structures.

Thus it can be seen by referring to FIGS. 4–10 how the use of the flaps 22 and 24 and the novel construction of the face portion 15 of the fender 10 readily allows the fender to be secured snugly and easily to a variety of sized and shaped dock beams, or other type surfaces to provide resilient cushioning features, as selectively desired.

As an added feature of the invention, the panel surfaces 16 and 18 of the fender 10 are beveled transversely at a 45° angle at about the mid-point of the body of the fender 10, as is best illustrated by FIGS. 1 and 2. The bevels on the ribs 16 and 18 terminate in a transversely directed channel 32. The purpose of such channel 32 and the bevels on the rib portions 16 and 18 is to allow the body of the fender to be folded in the direction of arrow 34 of FIG. 2 whereby the body is easily bent at the channel 32 into a 90° angle. Such feature allows the fender 10 to snugly fit around a corner portion of a dock or the like, as particuarly shown in FIG. 9 of the drawings.

The fender is preferably formed by utilizing conventional rotational casting techniques to make the hollow body or shell 12, but with the integral flaps solid. A suitable foam is then injected to fill the cavity, or in certain desired situations air may be used to pressurize the shell as indicated above.

While in accordance with the patent statutes only one best known embodiment of the invention has been illustrated and described in detail, it is to be particularly understood that the invention is not limited thereto or thereby, but that the inventive scope is defined in the appended claims.

What is claimed is:

1. A fender for attachment to a surface to provide the resilient cushioning thereof comprised of an elongate resilient body having a face portion formed from two substantially flat panel surfaces separated from each other by a V-shaped groove adapted to abut against and conform substantially to the surface of the object to which the fender is to be secured, and integral flap portions extending from the lateral margins of the face portion with opposed longitudinally extending indents provided on opposite faces of each flap portion substantially at the joinder of the flap portion with the body to allow each flap portion to be freely foldable along the indents in either direction in relationship to the body to facilitate securing the fender to the object.

2. The fender according to claim 1 where the body is formed from a hollow, flexible plastic shell filled with flexible foam.

3. The combination according to claim 1 wherein the panel surfaces at about the mid-point of the body are transversely beveled at a 45° angle and terminate in a transversely directed channel adjacent the outer surface of the body to allow the body to be bent at the channel into angular relationship.

4. The combination according to claim 1 where the body is formed from a continuous extrusion of a cross-sectional configuration defining a face portion and integral flap portions, with a longitudinally running V-groove centrally positioned in the face portion, and a longitudinally running V-groove adjacent where each flap portion attaches to the body.

5. A fender for attachment to a surface to provide resilient cushioning thereof comprised of an elongate resilient body having a face portion formed from two substantially flat panel surfaces separated from each other by longitudinally extending V-shaped grooves, integral flap portions extending from the lateral margins of the face portion and foldable along the margins toward or away from the face portion to facilitate securing the fender to the object, opposed longitudinally extending indents provided on opposite faces of each flap portion substantially at the joinder of the flap portion with the body to allow each flap portion to be freely foldable along the indents in relation to the body, and wherein the panel surfaces at about the mid-point of the body are transversely beveled at a 45° angle and terminate in a transversely directed channel near the outside surface of the body to allow the body to be bent at the channel into an angular relationship.

References Cited

UNITED STATES PATENTS

| 2,848,725 | 8/1958 | Sloulin | 114—219 X |
| 3,109,405 | 11/1963 | Nusinoff | 114—219 |
| 3,179,397 | 4/1965 | Cleereman et al. | 114—219 X |
| 3,250,040 | 5/1966 | Squires | 49—482 |
| 3,306,053 | 2/1967 | Fulton | 61—48 |
| 3,353,321 | 11/1967 | Heilweil et al. | 49—478 |

FOREIGN PATENTS

| 944,720 | 6/1956 | Germany. |
| 525,017 | 8/1940 | Great Britain. |

JACOB SHAPIRO, *Primary Examiner.*